United States Patent [19]

Schulze et al.

[11] Patent Number: 5,779,865
[45] Date of Patent: Jul. 14, 1998

[54] ELECTROLYSIS CELL FOR GENERATING OZONE AND/OR OXYGEN

[76] Inventors: Dirk Schulze, Langenbachstr. 2, 53113 Bonn; Wolfgang Beyer, Bergstr. 35, 53359 Rheinbach, both of Germany

[21] Appl. No.: 617,055

[22] Filed: Mar. 18, 1996

[30] Foreign Application Priority Data

Mar. 17, 1995 [DE] Germany ............... 295 04 323 U

[51] Int. Cl.$^6$ ................ C25B 9/00; C25B 1/00
[52] U.S. Cl. ............ 204/252; 204/242; 204/286; 205/626; 205/630; 205/633
[58] Field of Search ............ 204/242, 252, 204/286; 205/626, 628, 630, 633

[56] References Cited

U.S. PATENT DOCUMENTS

| | | | |
|---|---|---|---|
| 4,089,768 | 5/1978 | Fischer et al. | 204/271 |
| 4,107,021 | 8/1978 | Okazaki | 204/263 |
| 4,290,873 | 9/1981 | Weaver | 204/228 |
| 4,676,882 | 6/1987 | Okazaki | 204/260 |
| 5,205,990 | 4/1993 | Lawless | 422/121 |

FOREIGN PATENT DOCUMENTS 4227732  2/1994  Germany.

OTHER PUBLICATIONS

WPIDS abstract of DE4227732 (Fischer et al.), Feb. 24, 1994.

*Primary Examiner*—Kathryn L. Gorgos
*Assistant Examiner*—Alexander Noguerda
*Attorney, Agent, or Firm*—Antonelli, Terry, Stout, & Kraus, LLP

[57] ABSTRACT

The invention relates to an electrolysis cell for generating ozone or oxygen from superpure water with a solid electrolyte membrane located in a multipartite housing with electrodes designed to be directly connected to the membrane as porous structures, with the membrane separating the cathode space from the anode space and the pressure of both electrodes acting on the membrane being generated by means of a pressure device acting on at least one of the electrodes, with a pressure screw equipped with a convex head being provided as a pressure device, said screw being so arranged that the convex head rests centrally directly on the cathode or anode, and an indentation is pressed into the cathode surface or anode surface by the action of the pressure applied.

12 Claims, 7 Drawing Sheets

IONIC CLUSTERS

CRYSTALLITES

AMORPHOUS HYDROPHOBIC $$-[(CF_2-CF_2)_m-CF-CF_2]_x-$$
$$|$$
$$(O-CF_2-CF)_m-O-CF_2-CF_2-SO_3H$$
$$|$$
$$CF_3$$

ELECTROLYSIS CELL FOR GENERATING OZONE AND/OR OXYGEN

FIELD OF INVENTION

The invention relates to an electrolysis cell for generating ozone and/or oxygen from superpure water with a solid electrolyte membrane disposed in a multipartite housing, said membrane being in direct contact with electrodes designed as porous structures, with the membrane separating the cathode space from the anode space, and with a surface pressure acting on the membrane and on both electrodes, said pressure being generated by a pressure device acting on at least one of the electrodes.

BACKGROUND OF THE INVENTION

Electrolysis cells for generating ozone based on ion-exchange membranes in direct contact with electrodes said electrodes consisting of a porous material or coated therewith, are characterized by the ability to operate at high current densities and hence high reaction rates. The ion-exchange membrane acting as the solid electrolyte membrane simultaneously acts as a separator for the anode and cathode spaces and the electrolytes. Cells of this design have been known for some time, with hydrated, perfluorinated cation-exchange membranes being used, said membranes exhibiting an electrochemical stability with respect to the reducing or oxidizing effect of the electrodes (uncoated or coated Nafion 117 membrane, see Stucki "Reaktion und Prozesstechnik der Membrel-WasserElektrolyse," Dechema Monografien Verlag Chemie 94 (1983) 211).

Mention should also be made of the *Handbook of Water Purification*, second edition, Walter Lorch/Ellis Horwood Ltd. 1987, Pages 513 to 529, as well as the special issue of Suisse Chem 8 (1986) 10a, pages 31 to 33, "Funktionsweise und Einsatzgebiete eines elektrochemischen Ozonerzeugers" by Bauman and Stucki (in English: "In Situ Production of Ozone in Water Using a Membrel Electrolyzer" of Mrs. S. Stucki, G. Theis, R. Kotz, H. Devantay and H. J. Christen, published in Journal of the Electrochemical Society, Volume 132, No. 2, February, 1985). Such cells can be operated basically in media with a low electrical conductance, for example chemically pure water. The electrochemical reactions on the electrodes during operation in superpure water result in the formation of hydrogen and oxygen; when special anode materials are used, a mixture of oxygen and ozone can be produced instead of pure oxygen.

Electrolysis cells of this type require the porous and planar anode and cathode to be pressed against the surfaces of the solid electrolyte membrane. The pressure applied to the membrane is therefore an important parameter for optimum operation of the cell. Thus the cell voltage and current yield depend on the pressure applied. The pressure applied must be as homogenous as possible over the entire surface to achieve a uniform current distribution over the entire electrode surface. This is particularly problematical in electrodes with large surface areas.

It is known that electrolysis cells of this kind can be designed such that the pressure applied is transmitted to the cell housing by a circle of screws or tie rods. The pressure exerted by the screws is distributed to the sealing surfaces of the housing parts of the electrolysis cell to be connected together and over the surface pressure of the electrodes with respect to the solid electrolyte membrane.

In such designs, the electrodes must be manufactured with very low tolerances so that sealing and pressure functions can be fulfilled simultaneously. In addition, when the screws are tightened, there is a risk of tilting that results in inhomogeneous distribution of the applied pressure and thus to inhomogeneous current distribution.

SUMMARY OF THE INVENTION

The goal of the invention is to provide a simple economical design for an electrolysis cell of the type according to the species for producing ozone and/or oxygen, in which it is possible with simple means to achieve a uniform pressure for application of the electrodes against the solid electrolyte membrane and to permit a simple assembly of the electrolysis cell.

According to the invention this goal is achieved in an electrolysis cell according to the species by having the pressure device include a pressure screw equipped with a convex head, said screw being arranged such that the convex head is placed centrally directly on the cathode or anode and forms an indentation in the cathode surface or anode surface under the influence of the applied pressure. Since the cathode and anode are made of a porous material, for example a ductile sintered material, for making ozone or oxygen, the convex head of the pressure screw can be forced into the surface of the cathode or anode by exerting a pressure, resulting in the formation of an indentation, and as a result of this indentation a very uniform pressure and very good contact with the cathode and anode can be produced, and a very uniform pressure can be exerted through the cathode or anode on the membrane. In addition, angle errors in the pressure screw during application of pressure are compensated as well. A precondition for optimum exertion of a uniform pressure by the cathode and/or anode on the membrane is the central guidance of the pressure screw. With the aid of the pressure screw according to the invention, a spherical central indentation is created, namely a dent in the form of a concave spherical segment that permits very good contact and hence very good pressure transmission with uniform distribution over a larger area. In particular, the pressure transmitted by the pressure device, namely the pressure screw, is applied directly to the cathode and anode. Advantageous embodiments of the electrolysis cell according to the invention are included in the characterizing features of the subclaims. For economical manufacture of the electrolysis cell, it is proposed to assemble the housing of a central cell body with covers on both the anode side and the cathode side. The covers are preferably made of a corrosionproof nonconducting material, for example a suitable ozone-resistant plastic, especially a polymer containing fluorine, such as polyvinylidene fluoride (PVDF), perfluoroalcoxy (PFA), polytetrafluoroethylene copolymer (PTVE copolymer), polyfluoroethylene propylene (PEP), or ethylene-tetrafluoroethylene copolymer (ETFE). The housing body can also be made of one of the above-mentioned ozone-resistant plastics. All housing parts made of plastic can be produced by injecting molding for example.

It is also possible to make the central housing part, i.e. the cell body, of metal, especially corrosionproof and ozone-resistant stainless steel. When the cell body is made of stainless steel, the anode carrier is insulated from the cell body by insulating inserts, based for example on fluorinated polymers, like those used for the covers, or tight ceramic materials. The metal cell body is then at cathode potential (minus pole).

For simple assembly, it is also proposed that the cell body be formed symmetrically with respect to its central axis, having a through bore with shoulders expanding in stages starting at the anode side and progressing to the cathode side. The first shoulder serves as a supporting surface for an anode carrier with a mounted anode, the second shoulder serves as a supporting surface for the membrane and a centering ring for the cathode, and the third shoulder serves as a supporting surface for a yoke disk. The disk-shaped cathode is preferably fitted into the centering ring. A gap remains between the yoke disk and the cathode, and the yoke disk abuts the centering ring. The yoke disk serves to guide and receive the pressure screw that creates the pressure that presses the electrodes against the membrane. By virtue of the gap remaining between the cathode and the yoke disk, it is possible for the pressure screw to act directly on the cathode with its convex head in order to produce the required pressure on the membrane.

According to another proposal of the invention, the power leads to the anode and cathode are each provided in the vicinity of the covers. The electrolysis cell and the housing are essentially rotationally symmetrically arranged around a central middle axis.

In order to press the cathode perfectly against the membrane by means of the pressure screw, it is proposed to make the inside diameter of the centering ring equal to the inside diameter of the preceding shoulder that receives the anode forming an expansion in the bore, so that the cathode is placed in this centering device and accordingly can be pressed toward the membrane and anode. For a simple installation of the anode including the power leads, an anode carrier made of metal and T-shaped in cross section is provided and fitted centrally into the cell body in a hole on the anode side. The anode carrier is preferably provided on its side facing the membrane with channels between ribs running parallel to one another, with a porous anode plate 1 to 2 mm thick made of an oxidation catalyst material resting on the ribs as a cover. Openings for reaction media to enter and leave are preferably provided in the walls of the central cell body. Measuring devices such as thermometers and temperature sensors are preferably mounted on the cathode side of the electrolysis cell in the vicinity of the cover on the cathode side.

A power supply is required for operating the electrolysis cell, with the power leads as well as the measuring leads for the temperature measurements as well as other measured values being connected with the power supply with a line connection and a battery, including operating and display elements. In particular, line switches, selector switches, potentiometers, ammeters, voltmeters, low-water alarms, overheating alarms, cell short circuit indicators, battery emergency operation indicators, battery charging indicators, line voltage available indicators, control circuit active indicators, buffer current flowing in cell indicators, and battery charge indicators are provided in the form of operating and/or display elements.

BRIEF DESCRIPTION OF DRAWINGS

The invention will now be described with reference to the drawing showing an embodiment, wherein.

Figure 1:
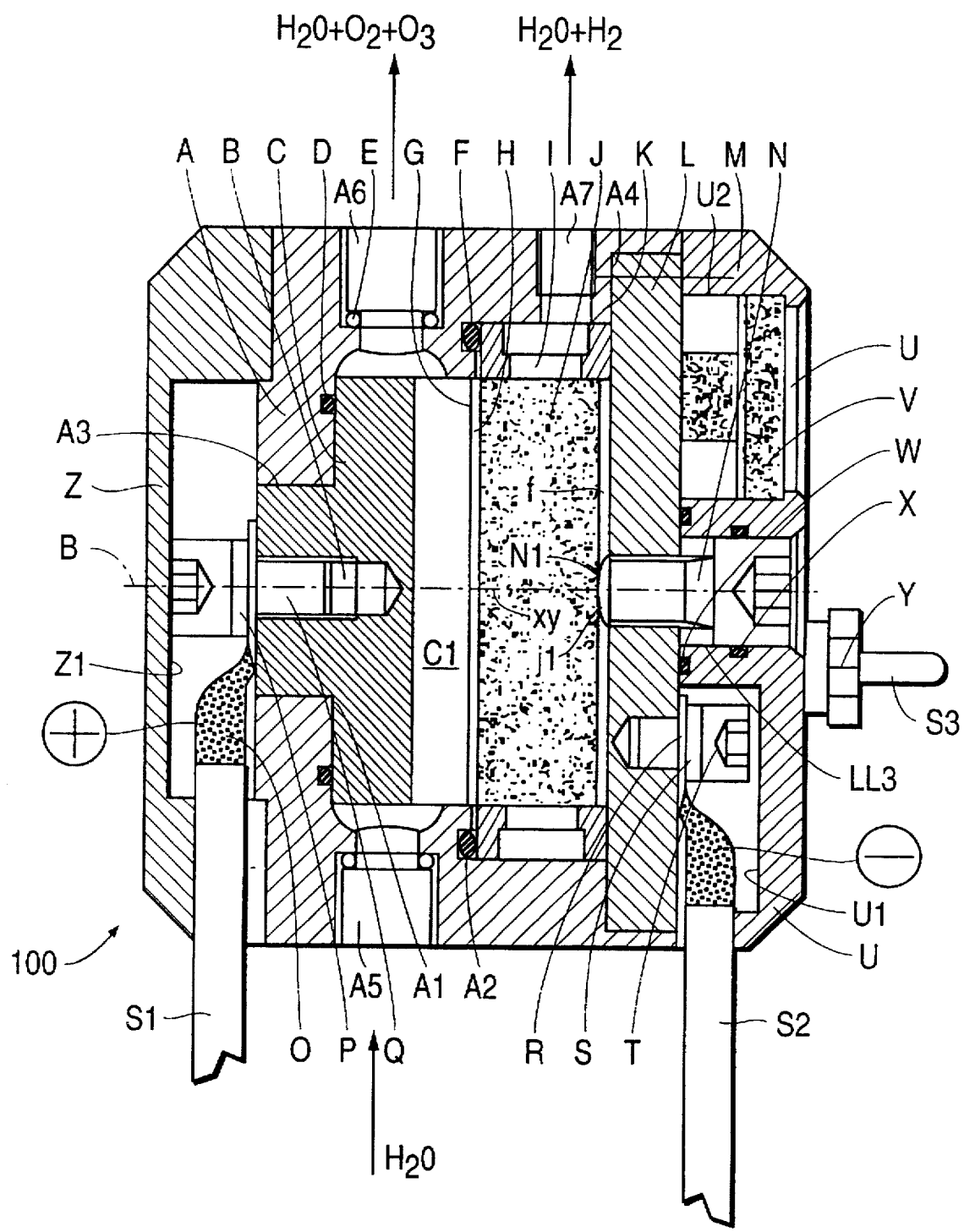
FIG. 1 is a cross section through an electrolysis cell for producing ozone.

Electrolysis cell 100 as shown in FIG. 1 has a multipartite essentially rotationally symmetrical housing with a central axis XY made of a corrosionproof thermoplastic plastic, such as a fluorinated thermoplastic plastic, polyvinylidene fluoride for example. The housing is in three parts, with a cell body A as well as a cover Z on the anode side and a cover U on the cathode side, each connected to cell body A during final assembly by two screws T1 and T2, see FIG. 2, which are inserted in bore holes passing through the housing from cover Z to cover U. In the first step however, cell body A is assembled. Cell body A has central axis XY and a through bore A3 that expands stepwise in three shoulders starting at the anode side and proceeding to the cathode side, namely a first expansion A1, a second expansion A2, and a third expansion A4. Anode G is designed as an anode plate and made of a porous or porously coated material such as titanium or is coated with platinum or $PbO_2$, and is mounted on a metallic electrically conducting anode carrier C, T-shaped in cross section. Anode carrier C is made with ribs on its side facing membrane H, with channels to allow the reaction media to flow through being provided between ribs Cl. The anode pole grate G rests permanently as a cover on the ribs. Anode carrier C is inserted into bore A3 of cell body A. Together with the foot of T-shaped anode carrier C and anode G, it fills the expansion in the through bore of the cell body created by shoulder A1, namely up to second shoulder A2. The solid electrolyte membrane H is located in second shoulder A2, said shoulder being pressed in the vicinity of shoulder A2 by centering ring I, a metal ring. Porous cathode disk J is located in the through interior of the centering ring in such fashion that it abuts membrane H. While centering ring I extends as far as third shoulder A4 and is flush therewith, cathode J ends a short distance before that point so that yoke disk L, which is located in the expansion formed by shoulder A4 and made of metal, abuts the centering ring, but leaves a small gap f with respect to cathode J.

The closure on the cathode side is formed by cover U, said cover being mounted by means of screws on yoke disk L and permanently connected with cell body A by exerting pressure, so that pressure transmission from yoke disk L takes place through centering ring I against membrane H located in shoulder A2, anode G, and anode carrier C in such fashion that the latter are tightly and permanently connected together, each with interposition of sealing rings, namely sealing ring D, sealing ring F, sealing ring K, and sealing ring W.

Figure 5:
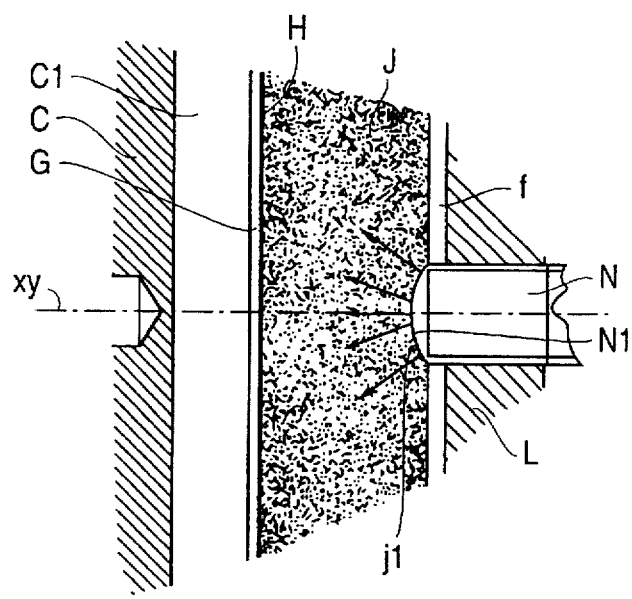
FIG. 5 shows a detail in FIG. 1, the pressure screw with convex head.
Figure 6:
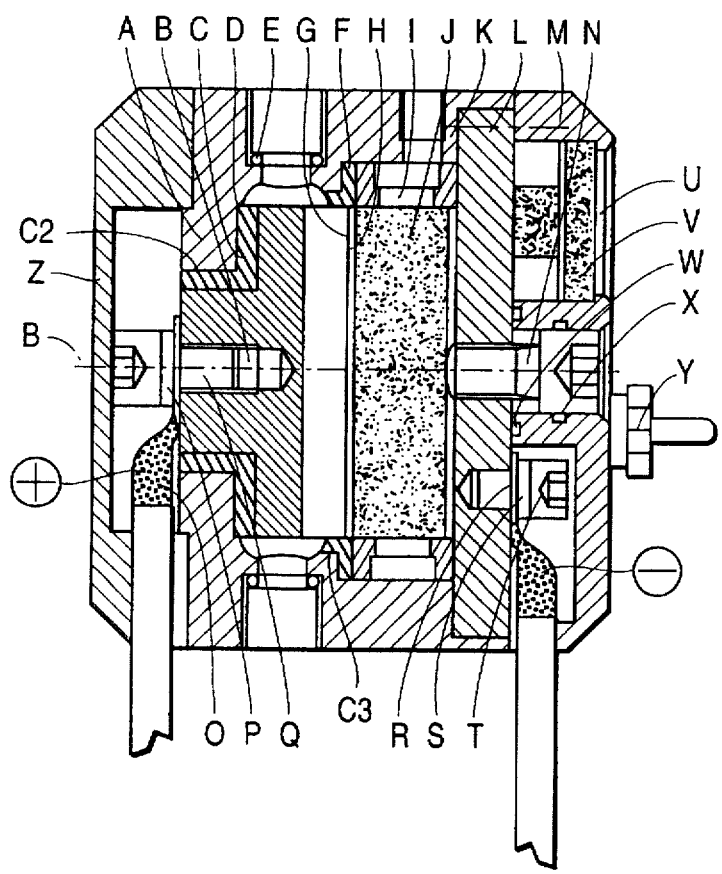
FIG. 6 is a cross section through the electrolysis cell in FIG. 1, with a metal cell body.

The uniform pressure exerted by electrodes G and J on membrane H is produced by pressure screw N, introduced through cover U on the cathode side and through a central threaded bore L1 in yoke disk L. Pressure screw N has a convex head N1 by which it directly abuts cathode J centrally with respect to middle axis XY and, because of the pressure applied, produces an indentation J1 in the porous ductile material of cathode J, cf. FIG. 5, by means of convex head N1, and produces a uniform homogenous pressure distribution, cf. arrows in FIG. 5, and pressure transmission, so that cathode J is pressed uniformly over the entire surface against membrane H, and membrane H is therefore also pressed uniformly against anode plate G. In the vicinity of cover U on the cathode side, a thermometer V and a temperature sensor Y with a control lead S3 are also provided. The thermometer is located in a recess U2 in cover U and pressure screw N is located in a through bore U3 in cover U. In addition, another recess U1 is provided in cover U, forming current lead S2 for the cathode with cable lug R, lock washer S, and cylinder-head screw T for securing it in yoke disk L.

Current lead S on the anode side is also provided in the area between cover Z and cell body A, with a recess Z1 being provided in cover Z. By means of cable lug O, lock washer P, and cylinder-head screw T, the current supply to anode carrier Z is additionally fastened by means of cylinder-head screw T. The provision for the reaction media to enter and leave is provided in cell body A, transversely with respect to middle axis XY, in the form of bores A5, A6, and A7. Bore A5 which leads into the space on the anode side serves to supply superpure water $H_2O$, while on the opposite side bore A6 serves as an outlet for water $H_2O$ and ozone ($O_3$) and oxygen $O_2$. The reaction media can flow through the channels formed between ribs C1 of anode carrier C. On the cathode side of the cell is outlet A7 for permeating water $H_2O$ and the hydrogen $H_2$ that forms as a result of ionic migration through the membrane. Membrane H simultaneously divides the cell interior into the anode space and the cathode space. In the vicinity of the openings for the reaction media to enter and leave, sealing rings E are also provided for the connections. Pressure screw N with cylinder-head screw M is also sealed off from cover U by means of ring seals.

Electrolysis cell 100 thus has an encapsulated temperature-measuring device, insulated terminals, and a corrosionproof nonconducting housing.

Figure 2:
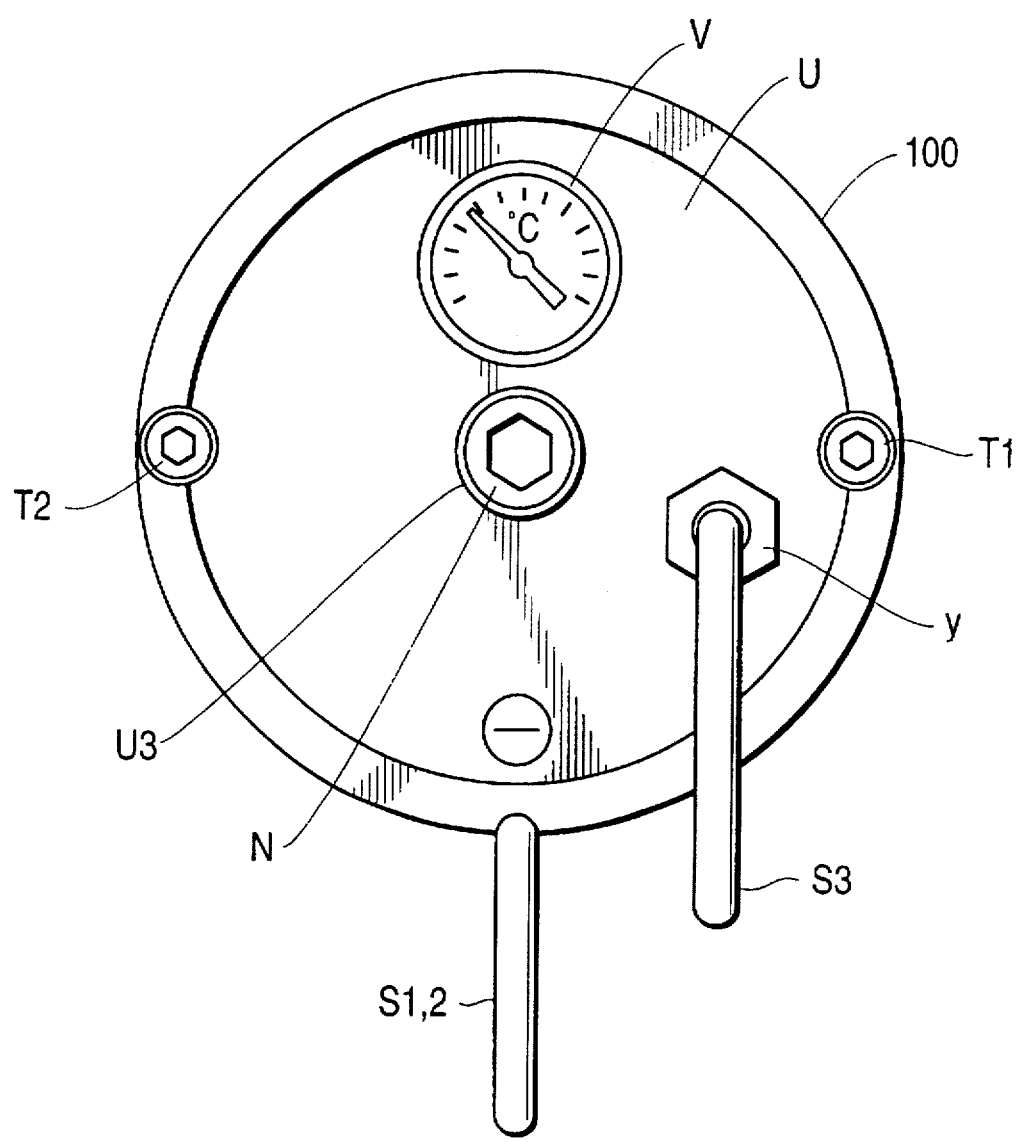
FIG. 2 is a right-side view of the electrolysis cell in FIG. 1.

FIG. 2 shows a side view of electrolysis cell 100 with built-in thermometer V, cover U on the cathode side, fastening screws T1, T2, cylinder-head screw M located in bore U3 of the cover, and connection S3 for temperature sensor Y, as well as (in the top view) current leads S1, S2 for the anode and cathode.

Figure 3:
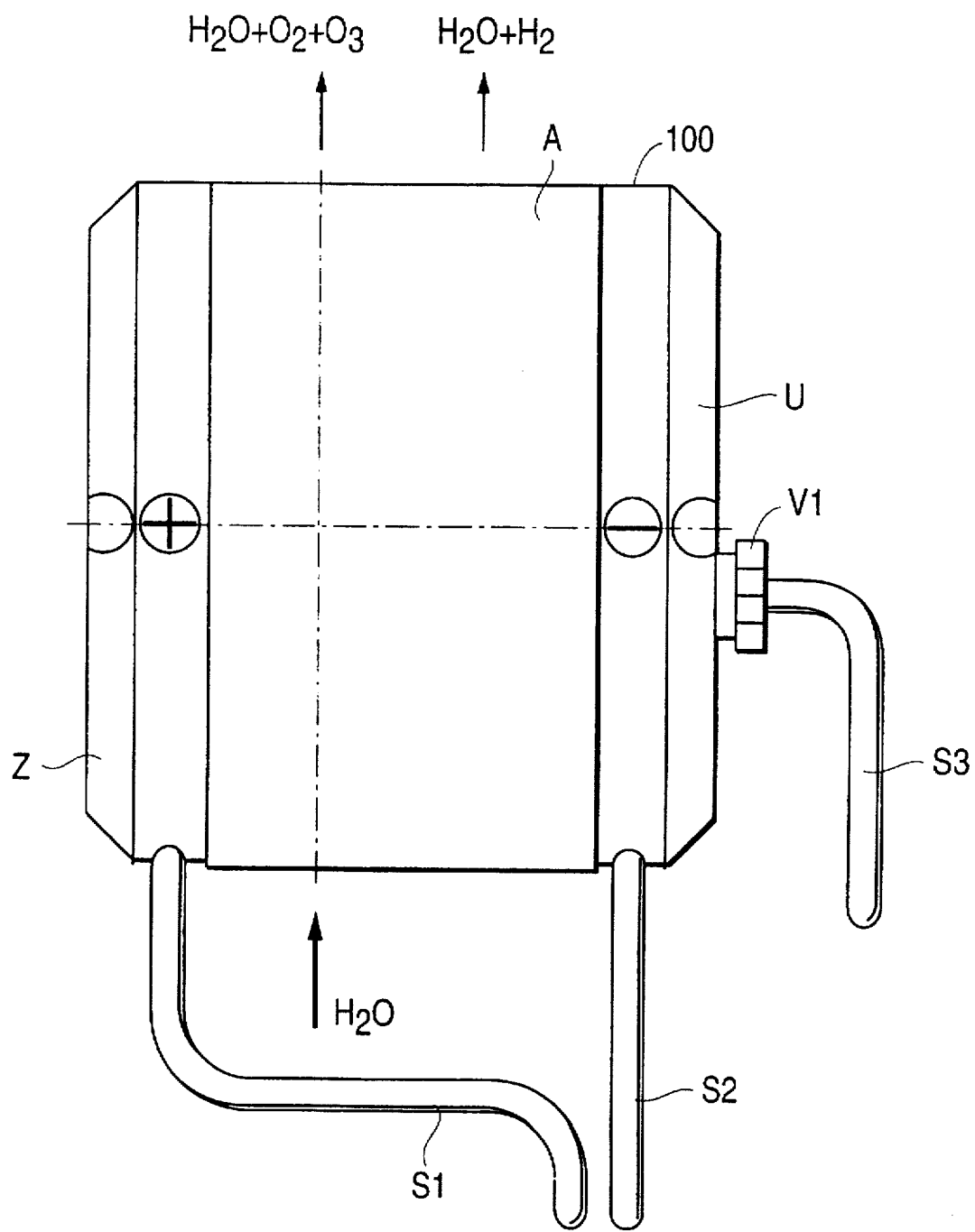
FIG. 3 is a bottom view of the electrolysis cell according to FIG. 1.

FIG. 3 shows a side view of electrolysis cell 100 with a central cell body A, covers Z and U on the sides, current leads S1 and S2, and S3 as the control lead cable for temperature monitoring of the temperature sensor, fastened by means of screw V1 to cover U.

The example shows an electrolysis cell with a pressure device acting on the cathode surface. It is also possible to reverse the design, in other words to reverse the positions of the anode and cathode so that the pressure screw then acts directly on the anode surface. The terminals of the cell body are reversed accordingly.

Figure 4:
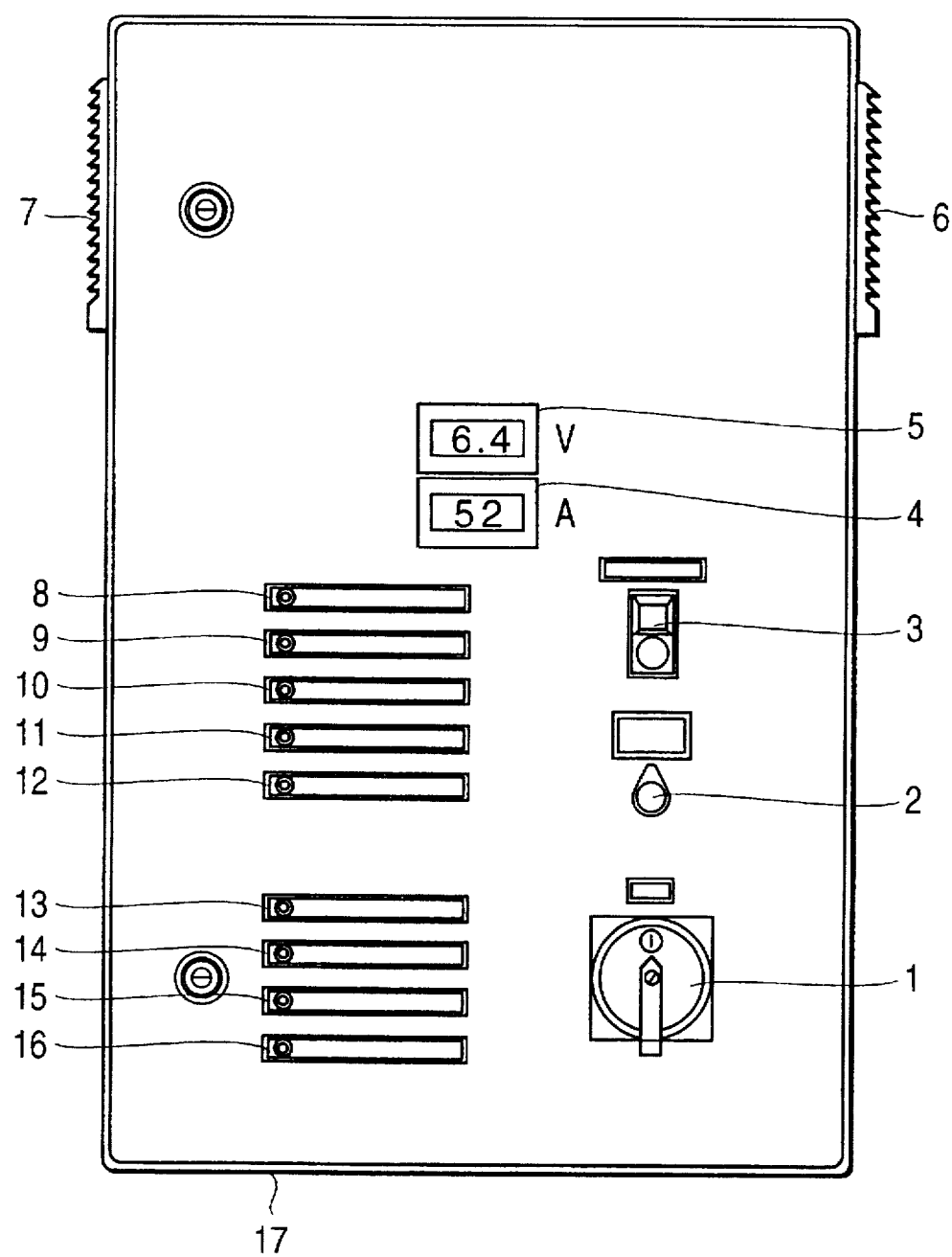
FIG. 4 shows the power supply for the electrolysis cell.

FIG. 4 shows the power supply for the electrolysis cell of FIG. 1 to which current supply leads S1 and S2 are fed as well as control lead S3 and possibly additional measurement leads for measurement signals from the electrolysis cell. In the present case, power supply 17 is equipped with a line connection and an operating element 1 therefor as well as a battery, and has inlet screen 6 and outlet screen 7 in the upper area for a fan located in the power supply. With operating element 2, a switch, the type of regulation can be set to reflect current values. Reference numeral 3 represents an operating element for a potentiometer for an internal current setting for the desired ozone production, 4 and 5 constitute the current display and voltage display, 8 indicates the display element for a low-water alarm, a red LED, 9 is a display element for an overheating alarm, a red LED, 10 is a display element for a cell short circuit, a red LED, 11 is a display element for emergency battery operation, a red LED, 12 is an indicating element for battery charging operation, a red LED, 13 is the display element for the power supplied by the line, a green LED, 14 is a display element for the active control circuit, a green LED, including remote on/off switching, 15 is a display element for the buffer current flowing in the cell, a green LED, and 16 is a display element indicating the battery is charged, green LED.

Depending on the anode material used, oxygen alone or an ozone-oxygen mixture can be produced.

It is also possible to make at least cell body A of the housing of the electrolysis cell of metal, especially a corrosionproof stainless steel. FIG. 4 shows the electrolysis cell according to FIG. 1 in which cell body A, in contrast to the design in FIG. 1, is made of stainless steel. In this case it is necessary to insulate anode carrier C from cell body A with insulating inserts C2, C3 made for example of ozone-resistant plastics containing fluorine, like those used for covers as well. The cylinder-head screw is also insulated by means of an insulating bushing, not shown here in greater detail, made of an electrically insulating material, for example one of the above-mentioned plastics.

The electrolysis cell according to the invention, with a power supply, can be used to generate ozone, an extremely effective oxidizer, for a wide variety of applications in chemistry and the pharmaceutical industry, for treating drinking water, mineral water, swimming pools, used water, cooling water, and wastewater, for sterilization, disinfection, etc., and in the cellulose, paper, textile printing, and plastics industries as well as the food industry, in metallurgy, the raw materials industry} and for treating exhaust gases and exhaust air, environmental pollution, and for ecology.

Figure 8:
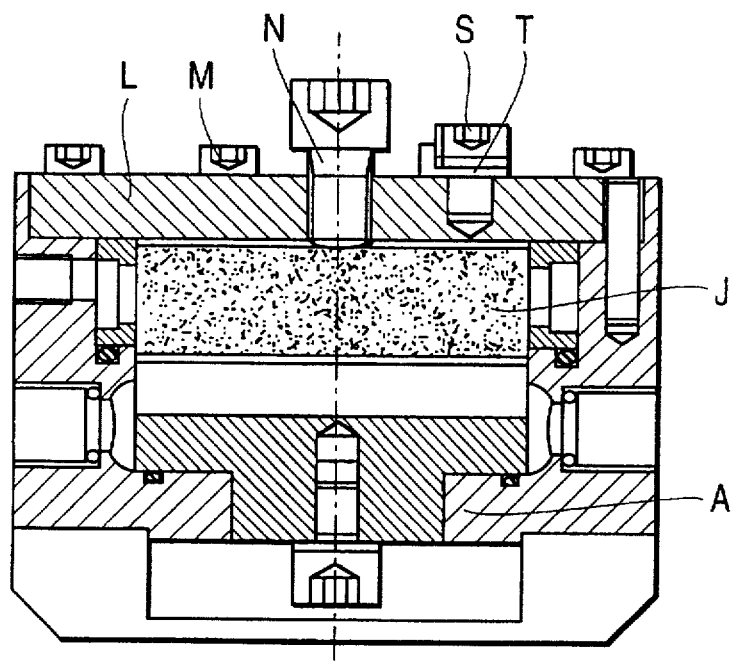
FIG. 8 is another cross-section view of the cell showing further details of the assembly of the cell.
Figure 9:
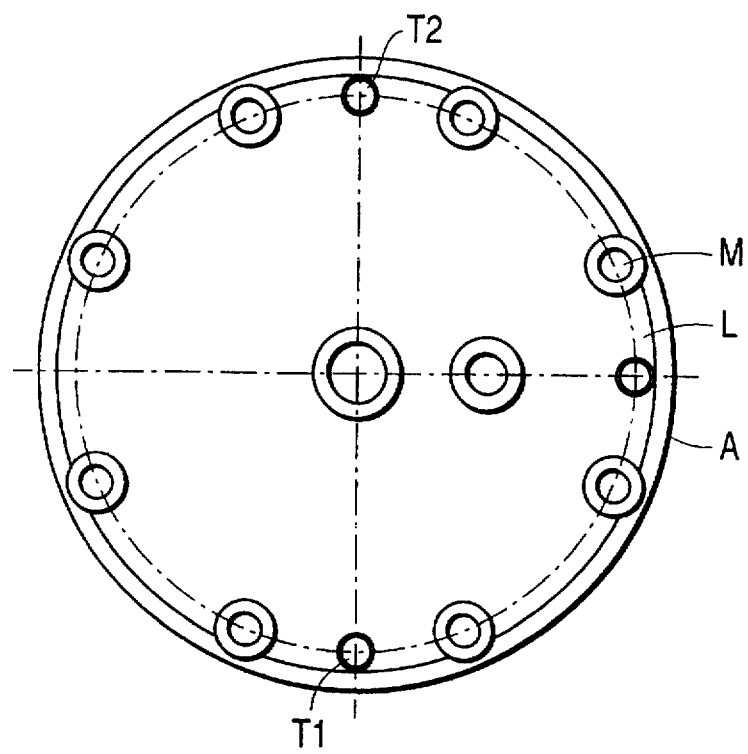
FIG. 9 is a top view of the partially assembled cell as shown in FIG. 8 showing the arrangement of screws for securing the yoke disk to the cell body.

FIGS. 8 and 9 show the partial assembling of the yoke disk L and the screws M in a cross-section and a top view.

Figure 7:
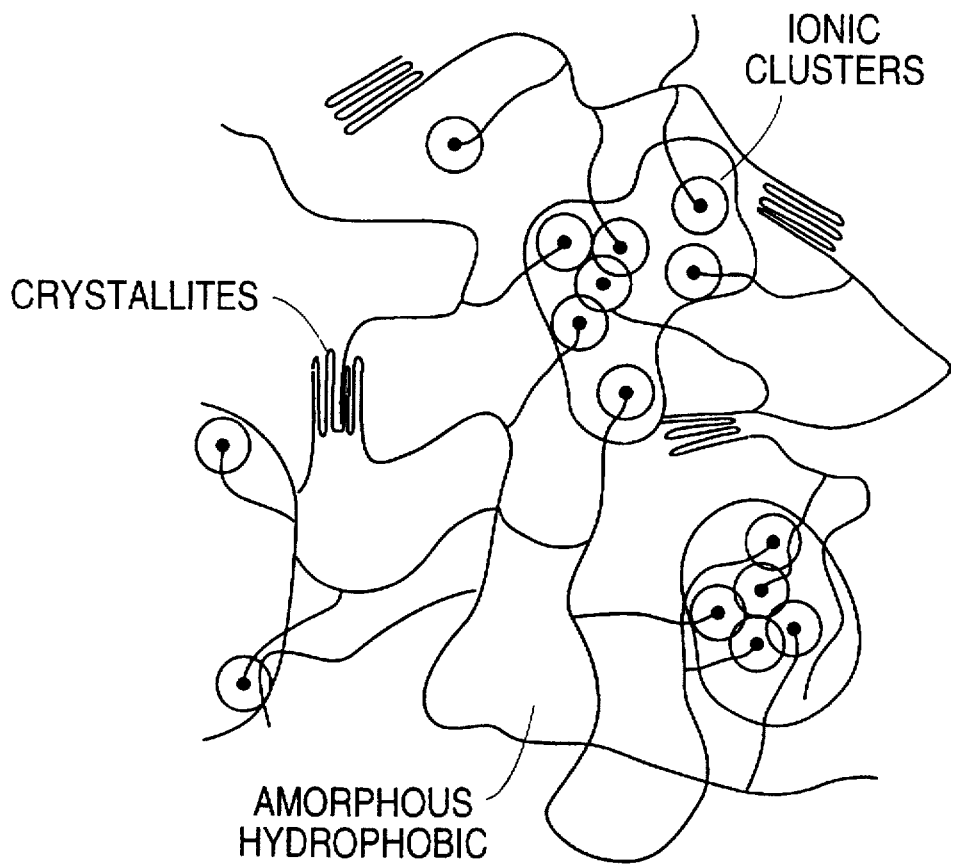
FIG. 7 is a schematic illustration of the structure of a material (Nafion®) for making the solid electrolyte membrane.

The solid electrolyte membrane H is a perfluorinated ion exchange membrane. The membrane is made from a material received from copolymerization of tetrafluoroethylene with a monomer comprising functional sulfonyl groups. Such a material is available from DuPont under the trade name Nafion® is shown in the attached FIG. 7. The material is segregated into hydrophobic and hydrophilic areas. The ion exchange groups from hydrophilic areas of separated aggregated, so-called "ionic clusters". In contact with water, the sulfone groups dissociate and the membrane swells and becomes conductive, i.e. the hydrophilic areas receive the character of a electrolyte solution with dissociated ions and hydrated ions.

The anode G is for instance, formed by porous titanium sintered material, which is then platinated and then covered with a $\beta$-PbO2-layer. Instead of an intermediate layer of platinum it is possible to have an intermediate layer of platinum metals.

New electrode material may use as base metal titanium. The binary coatings consist of a conducting oxide ($RuO_2$, $IrO_2$ or $PtO_x$) and a non-conducting stabilizing component ($TiO_2$, $ZrO_2$ or $Ta_2O_5$).

The cathode J may comprise a porous graphite current collector plate with a platinum catalyst deposited onto the surface contacting the membrane H. Preferable, the cathode is made solely of a porous sintered bronze or made of sintered copper.

The pressure transmission from yoke disk L takes place through centering ring I against membrane H located in body A so that all are tightly and permanently connected together as described heretofore.

We claim:

1. Electrolysis cell for generating ozone and/or oxygen from superpure water comprising a solid electrolyte membrane located in a multipartite housing, said housing comprising a cathode space having a cathode and an anode space having an anode, said membrane being in direct contact with said cathode and anode made as porous structures, with said membrane separating the cathode space from the anode space, and a pressure device acting on at least one of said cathode and anode for producing a pressure which acts on said membrane, wherein the pressure device contains a pressure screw having a convex head, so arranged that said convex head is placed directly and centrally on a surface of said cathode or anode, and contacts an indentation in the form of said concave spherical segment which is formed by said convex head in a cathode surface or anode surface by action of the pressure device.

2. Electrolysis cell according to claim 1 wherein the housing further comprises a middle cell body receiving at least two electrodes and said membrane, with a cover on the anode side and a cover on the cathode side.

3. Electrolysis cell according to claim 2 wherein said middle cell body of the housing is made of a corrosion-proof metal which is stainless steel, and the anode carrier and the anode are electrically insulated from said middle cell body by means of insulating inserts made of plastic or polymers containing fluorine.

4. Electrolysis cell according to claim 2 wherein a thermometer and a temperature sensor are located beneath said cover on the cathode side.

5. Electrolysis cell according to claim 1 or 2 wherein the middle cell body is designed symmetrically with respect to its central axis with a through bore having first, second and third bore shoulders expanding stepwise starting at the anode side and proceeding to the cathode side, with first shoulder serving as a supporting surface for an anode carrier with a mounted anode; second shoulder serving as a supporting surface for membrane and a centering ring for the cathode; and with said third shoulder serving as a supporting surface for a yoke disk, and wherein a disk-shaped cathode is fitted into said centering ring, and with a gap remaining between said yoke disk and said cathode, with said yoke disk abutting said centering ring.

6. Electrolysis cell according to claim 5 wherein said centering ring has an inside diameter which is equal to the inside diameter of an expansion in the bore formed by said first shoulder.

7. Electrolysis cell according to claim 6, wherein said anode carrier is a metallic conducting anode carrier and is made T-shaped in cross section and is inserted by the foot of the T into a bore of said middle cell body on the anode side of the middle cell body and is made with ribs and channels running between ribs on the crossbar of the T on the side facing membranes and a current lead for the anode is fed between the middle cell body and cover and connected to anode carrier.

8. Electrolysis cell according to claim 5 wherein said yoke disk is made of a conducting metal and said current lead for the cathode is fed between the middle cell body and the cover on the cathode side and is connected to said yoke disk.

9. Electrolysis cell according to claim 5 wherein said middle cell body comprises openings, wherein one opening is for supply of super pure water, one opening is for outlet of water, ozone and oxygen, and one opening is for outlet of permeating water and hydrogen.

10. Electrolysis cell according to claim 1 wherein the middle cell body, the cover on the anode side and the cathode side are made of a nonconducting corrosionproof material selected from the group consisting of plastic, Polyvinylidene fluoride and ceramic.

11. Electrolysis cell according to claim 1 wherein current leads and measuring leads are connected to a power supply comprising a line connection and a battery with operating and display elements.

12. Electrolysis cell according to claim 11 wherein said battery operating elements are selected from the group consisting of a line switch, a selector switch for regulation, an operating element for a potentiometer for internal current setting for ozone production, an ammeter, and a voltmeter; and said display elements are selected from the group consisting of a low-water alarm, an overheating alarm, a display element for a cell short circuit, a display element for an emergency battery operation, an indicating element for battery charging operation, a display element for the power supplied by the line, a display element for the active control circuit, a display element for the buffer current flowing in the cell, and a display element indicating the battery is charged.

* * * * *